(12) United States Patent
Yoshida et al.

(10) Patent No.: US 7,373,589 B2
(45) Date of Patent: May 13, 2008

(54) KEYWORD CREATION METHOD AND ITS APPARATUS

(75) Inventors: Kimiyoshi Yoshida, Kanagawa (JP); Yasushi Takahashi, Chiba (JP); Yoshihito Fujiwara, Kanagawa (JP)

(73) Assignee: Sony Corporation, Tokyo (JP)

( * ) Notice: Subject to any disclaimer, the term of this patent is extended or adjusted under 35 U.S.C. 154(b) by 136 days.

(21) Appl. No.: 11/082,502

(22) Filed: Mar. 17, 2005

(65) Prior Publication Data

US 2005/0165769 A1    Jul. 28, 2005

Related U.S. Application Data

(63) Continuation of application No. 10/196,035, filed on Jul. 15, 2002, which is a continuation of application No. 09/416,297, filed on Oct. 14, 1999, now Pat. No. 6,430,560, which is a continuation of application No. 08/980,268, filed on Nov. 28, 1997, now Pat. No. 5,970,486.

(30) Foreign Application Priority Data

Nov. 29, 1996    (JP)    ................... 8-334516

(51) Int. Cl.
   *G06F 17/00*    (2006.01)
(52) U.S. Cl. ................... 715/221; 715/273; 725/61
(58) Field of Classification Search ............ 715/500.1, 715/505, 526, 221, 273; 725/61
   See application file for complete search history.

(56) References Cited

U.S. PATENT DOCUMENTS

| | | |
|---|---|---|
| 4,745,549 A | 5/1988 | Hashimoto |
| 5,075,771 A | 12/1991 | Hashimoto |
| 5,081,688 A | 1/1992 | Sakuragi |
| 5,179,649 A | 1/1993 | Masuzaki et al. |
| 5,381,477 A | 1/1995 | Beyers, II et al. |
| 5,406,384 A | 4/1995 | Sakuragi |
| 5,534,911 A | 7/1996 | Levitan |

(Continued)

FOREIGN PATENT DOCUMENTS

JP    8 077 184    3/1996

(Continued)

OTHER PUBLICATIONS

Hartley, Roberta, et al, "Guidelines for Multimedia Usage", ACM SIGDOC '93, 1993, pp. 95-106.*

(Continued)

*Primary Examiner*—William L. Bashore
*Assistant Examiner*—Laurie Ries
(74) *Attorney, Agent, or Firm*—Frommer Lawrence & Haug LLP; William S. Frommer; Thomas F. Presson

(57) ABSTRACT

A keyword creation method and its apparatus to simply create keywords in user's retrieving a desired item of information from a vast amount of information. The habitual situation characteristics and the degree of typical liking tendency of a user are calculated on the basis of answers on daily items of the user, typical situation dependent keyword(s) of the user in one or more individual typical situations previously prepared is (are) created in accordance with the degree of typical liking tendency of the user and typical situation dependent keyword(s) is (are) revised in accordance with the habitual situation characteristics of the user, so that keyword(s) according to the actual situation of the user can be created.

10 Claims, 11 Drawing Sheets

U.S. PATENT DOCUMENTS

| | | | |
|---|---|---|---|
| 5,696,869 A * | 12/1997 | Abecassis | 386/52 |
| 5,721,827 A * | 2/1998 | Logan et al. | 709/217 |
| 5,754,939 A | 5/1998 | Herz et al. | |
| 5,774,357 A | 6/1998 | Hoffberg et al. | |
| 5,798,785 A * | 8/1998 | Hendricks et al. | 725/46 |
| 5,875,108 A | 2/1999 | Hoffberg et al. | |
| 5,903,454 A | 5/1999 | Hoffberg et al. | |
| 5,920,477 A | 7/1999 | Hoffberg et al. | |
| 5,970,486 A | 10/1999 | Yoshida et al. | |
| 5,990,927 A * | 11/1999 | Hendricks et al. | 725/132 |
| 6,005,597 A | 12/1999 | Barrett et al. | |
| 6,081,750 A | 6/2000 | Hoffberg et al. | |
| 6,088,722 A | 7/2000 | Herz et al. | |
| 6,298,482 B1 | 10/2001 | Seidman et al. | |
| 6,324,338 B1 | 11/2001 | Wood et al. | |
| 6,430,560 B1 | 8/2002 | Yoshida et al. | |

OTHER PUBLICATIONS

Patent Abstracts of Japan, publication No. 06-124309 dated May 6, 1994.

* cited by examiner

SELECT THE ITEMS FIT FOR YOU WITH A CURSOR AND PRESS A DECISION BUTTON.

JOB: ○ JUNIOR/SENIOR HIGH-SCHOOL BOY/GIRL; ○ UNIVERSITY/COLLEGE STUDENT;
○ OFFICE WORKER; ○ SELF-EMPLOYED; ○ FULL-TIME HOUSEWIFE; ○ JOBLESS

WEDDING: ○ UNMARRIED; ○ MARRIED

CHILDREN: ○ NONE

○ ONE OR MORE ─┬─ ○ INFANT
　　　　　　　　├─ ○ JUNIOR/HIGHER SCHOOL BOY/GIRL OR UNIVERSITY/COLLEGE STUDENT
　　　　　　　　└─ ○ EMPLOYED

○ END

SELECT THE ITEMS FIT FOR YOU WITH A CURSOR AND PRESS A DECISION BUTTON.

AGE: ○ NINETEEN OR YOUNGER; ○ TWENTIES; ● THIRTIES; ○ FORTIES; ○ FIFTIES; ○ SIXTIES OR OLDER

SEX: ○ MALE; ○ FEMALE

○ END

FIG. 5

WHICH ARE YOU NEARER TO? SELECT THE RELEVANT MARK ○ IN EACH LINE.

| Left | | Right |
|---|---|---|
| · AFFIRM AND ENJOY THE TV WITH ALL MEMBERS.<br>· ACTIVELY PARTAKE IN AND REACT TO A PROGRAM.<br>· INTERACTIVE IN ALL MEMBERS. | NEITHER | · IT IS A LOSS OF TIME TO VIEW TV.<br>· WORTHLESS PROGRAMS ARE ABUNDANT. |
| · TV IS HELPFUL TO KNOWLEDGE AND CULTURE.<br>· NEWS, REPORTS AND SPORTS ARE GOOD. | NEITHER | · LIVELY AND MERRY PROGRAMS ARE FAVORITE.<br>· LOSE TIME IN DULL VIEWING. |
| · TV IS INDISPENSABLE ENJOYMENT AND AMUSEMENT.<br>· TV IS THE BEST FOR A CHANGE. | NEITHER | · IT WOULD BE WISE NOT TO VIEW TV IF POSSIBLE.<br>· IT IS WELL ENOUGH TO VIEW TV ONLY AT A FREE TIME. |
| · CONTINUE TV VIEWING DULLY WITHOUT INTENTION<br>· CANNOT CEASE TV VIEWING ONCE SWITCHING ON.<br>· ABSORBED IN TV AND SAPPING. | NEITHER | · VIEW LIKABLE PROGRAMS ALONE.<br>· VIEW TV ONLY AT AN EXCESS OF LEISURE. |
| · WANT TO VIEW A TOPICAL PROGRAM.<br>· TV SPECIAL AND EXTRA PROGRAMS ARE INTERESTING. | NEITHER | · TV IS NOT ALWAYS NECESSARY.<br>· RECENTLY, MANY PROGRAMS ARE WORTHLESS. |
| · HARDLY ANY PROGRAM IS VIEWED WITHOUT FAIL.<br>· THE PLOTLESS ARE EASIER IN MIND. | NEITHER | · THERE ARE SEVERAL PROGRAMS TO VIEW WITHOUT FAIL.<br>· PLOTTY PROGRAMS ARE FAVORITE. |
| · EASY AND PLOTLESS PROGRAMS ARE FAVORITE.<br>· IT IS FAVORITE TO LAUGH AT COMEDIES.<br>· RAKUGO (COMIC STORYTELLING) AND SUCHLIKE.<br>· LIGHT & LIGHT (NOT SERIOUS AND CHEERFUL). | NEITHER | · LONG DRAMA AND STORIES ARE FAVORITE.<br>· MOVED WITH DRAMAS AND MOVIES AND SYMPATHIZED WITH CHARACTERS.<br>· THOROUGHLY MOVED. |
| · IT IS FREQUENT TO VIEW ALONE.<br>· A RULE IS MADE OF VIEWING ONLY PROGRAMS TO WISH FOR. | NEITHER | · IT IS FREQUENT TO VIEW TV TOGETHER WITH YOUR FAMILY.<br>· PLEASANTLY VIEW TV IN A HAPPY CIRCLE OF YOUR FAMILY. |

FIG. 6

MAY I INQUIRE OF YOUR LIFE PATTERN? INPUT NUMERALS IN ☐

- AT WHAT O'CLOCK DO YOU TAKE BREAKFAST USUALLY?  a ☐ O'CLOCK ☐ MIN TO b ☐ O'CLOCK ☐ MIN
- AT WHAT O'CLOCK DO YOU TAKE LUNCH USUALLY?  c ☐ O'CLOCK ☐ MIN TO d ☐ O'CLOCK ☐ MIN

FIG. 8A  MEAL TIME FRAME :
(AT BREAKFAST)

[DAY(S) OF A WEEK = MON.-FRY.] × [TIME = 7:00-7:30]
+ [DAY(S) OF A WEEK = SAT.] × [TIME = 7:30-8:00]

FIG. 8B  REST TIME FRAME :
(AT YOUR EASE
ON A HOLIDAY)

[DAY(S) OF A WEEK = SAT.-SUN.] × [TIME = 8:00-11:30]

↑
SITUATION IDENTIFIER      REGIONAL EXPRESSION OF MEASURABLE
(TIME FRAME IDENTIFIER)   SITUATION NUMERICAL VALUE

KEYWORD CREATION METHOD AND ITS APPARATUS

This is a Continuation of application Ser. No. 10/196,035, filed Jul. 15, 2002, which is a Continuation of application Ser. No. 09/416,297, filed Oct. 14, 1999 now U.S. Pat. No. 6,430,560, which is a Continuation of application Ser. No. 08/980,268 filed Nov. 28, 1997 now U.S. Pat. No. 5,970,486.

BACKGROUND OF THE INVENTION

1. Field of the Invention

The present invention relates to a keyword creation method and its apparatus, and is appropriately applied, for example, to a program retrieval system for retrieving the programs necessary for a viewer from many TV programs distributed via a broadcasting satellite.

2. Description of the Related Art

With a satellite broadcast system wherein TV programs are distributed via a broadcasting satellite to viewer, TV signals are digitalized and a vast number of programs are simultaneously distributed. In such a system, the number of programs selected by a viewer increases markedly.

Besides, with a system for providing various items of information from the host side to computer terminals via a telephone line or private line, a user on the terminal side selects the necessary item of information from a vast amount of information and requests it to the host side.

In an attempt to select such TV programs, items of information using a computer or the like, a viewer or user must retrieve a desired program or information item from a vast number of programs or a vast amount of information. In this case, a viewer or user selects a word or the like related to the genre of the program to be selected or the information item to be selected as the keyword and retrieves a desired program or information item by referring to it.

In a way of a viewer or user to directly input a keyword to a retrieval system, however, a viewer or user need to always learn and renew a knowledge concerning an up-to-date keyword or genre classification method of information repeatedly according as programs or information items are renewed and has difficulty in readily selecting a desired keyword.

Besides, there is a method comprising storing keywords such as genres or words selected by a viewer or user in the past as a selection history and using them as keywords at the time of future retrieval. At a first time of using a retrieval system according to this method, no history information is present and a viewer or user is compelled to directly select and input a keyword to the system and has such difficulty in readily selecting a keyword as the above-mentioned case.

In such a manner, there was a problem that the retrieval operation of a viewer or a user is complicated and it is difficult to readily select a required program or information item.

SUMMARY OF THE INVENTION

In view of the foregoing, an object of the present invention is to provide a method and an apparatus for creating a keyword capable of retrieving the information item corresponding to the liking of a viewer or user.

The foregoing object and other objects of the invention have been achieved by inputting the answers of question items made to a user, calculating the habitual situation characteristics of the user and the degree of a typical liking tendency of the user on the basis of the answers, creating user's keyword(s) for typical situation(s) in one or more previously prepared typical individual situation(s) on the basis of the degree of user's typical liking tendency and correcting the keyword(s) on the basis of user's habitual situation characteristics, thereby creating the keyword(s) corresponding to user's actual situation.

According to the present invention, on the user's input of daily items such as his existing life stage and age/sex, his liking tendency and living scene/selected site environmental phase, the keyword creation block section creates the habitual situation conversion data related to user's habitual situation and the liking attribute ascribability data related to user's liking attribute, thereby automatically creating a group of retrieval keywords reflecting the liking tendency of a user under a specific situation in a specific field.

The nature, principle and utility of the invention will become more apparent from the following detailed description when read in conjunction with the accompanying in which like parts are designated by like reference numerals or characters.

BRIEF DESCRIPTION OF THE DRAWINGS

In the accompanying drawings:

FIGS. 4 to 7 are schematic diagrams showing an interaction screen to a user;

FIGS. 8A and 8B are schematic diagrams showing examples of habitual situation conversion data;

DETAILED DESCRIPTION OF THE EMBODIMENT

Preferred embodiment of the present invention will be described with reference to the accompanying drawings:

(1) General Configuration of a Satellite Broadcast Receiving System

Figure 1:
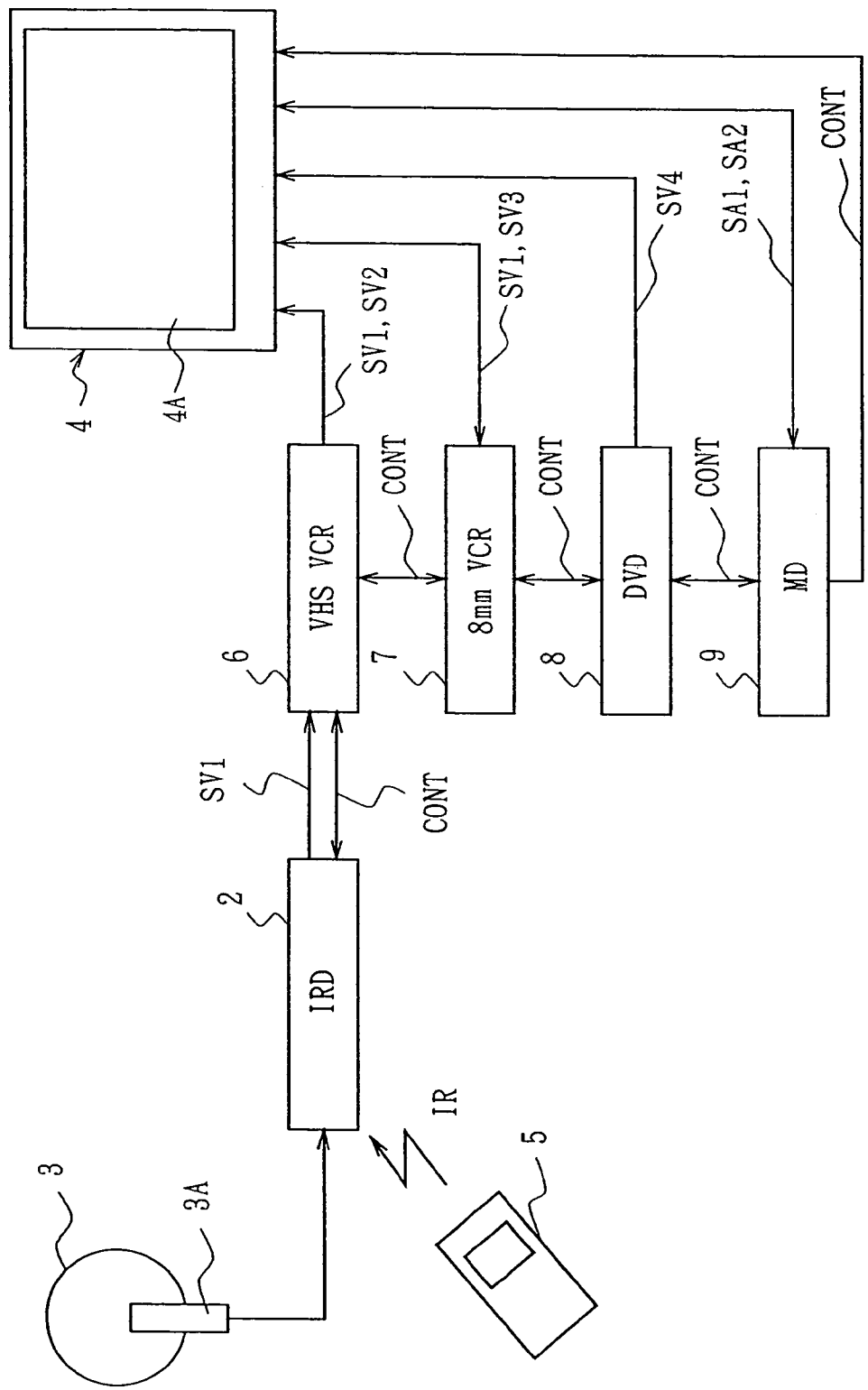
FIG. 1 is a block diagram showing a satellite broadcast receiving system using a keyword creation unit according to the present invention.

In FIG. 1, 1 denotes a satellite broadcast receiving system as a whole, while a broadcast signal received by a parabolic antenna 3 is demodulated and decoded in compression by an integrated receiver/decoder (IRD) 2. The resultant image/voice signal SV1 is delivered to the subsequent video cassette recorder (VCR) 6 of VHS type.

The VCR 6 records an image/voice signal SV1 onto a video tape loaded inside or directly monitor-displays image/voice signal SV1 by delivering it from an output line to a monitor device 4 as it is.

Besides, when a viewer manipulates a remote commander 5, the instruction corresponding to the relevant manipulation is converted into an infrared signal IR and delivered to the IRD 2. In accordance with the relevant instruction, the IRD 2 executes various operations, such as channel switching, registration/readout of user data and delivery of a control signal CONT to individual appliances (VCR 6, VCR 7, DVD 8 and MD 9) connected to the relevant IRD 2. A control signal CONT is delivered via a control line to the VCR 6. If the VCR 6 is specified by this control signal CONT as the control object, the VCR 6 is controlled by the relevant control signal CONT. In contrast to this, if any of the appliances (VCR 7 of 8 mm type, digital video disc (DVD) player 8, mini disc (MD) player 9 and monitor device 4) successively connected to the VCR 6 via a control line is specified as the control object, the VCR 6 delivers a control signal CONT to the subsequent VCR 7 of 8 mm type as it is.

On the input of a control signal CONT, the VCR 7 identifies the appliance specified by the control signal CONT. If the identified result is the VCR 7, the VCR 7 executes the operation specified by the control signal CONT. If this direction is, for example, a direction for the playback of an 8 mm video tape loaded on the VCR 7, the VCR 7 displays it by the playback of the video tape and the delivery of a playback signal SV3 to the monitor device 4. Besides, if the direction by a control signal CONT is a direction for recording a broadcast signal (image/voice signal SV1) received and decoded by the IRD 2 in the VCR 7, the VCR 7 records the image/voice signal SV1 inputted from the IRD 2 via a VCR 6 of VHS type and the monitor 4. In contrast to this, if the control object of a control signal CONT is not the VCR 7, the VCR 7 delivers the relevant control signal CONT to the subsequent DVD 8 as it is.

On the input of a control signal CONT, the DVD 8 identifies the appliance specified by the control signal CONT. If the identified result is the DVD 8, the DVD 8 executes the operation specified by the control signal CONT. If this direction is, for example, a direction for the playback of images or voices from the disk loaded on the DVD 8, the DVD 8 displays it by the playback of the disk to deliver an image/voice signal SV4 to the monitor device 4. In contrast to this, if the control object of a control signal CONT is not the DVD 8, the DVD 8 delivers the relevant control signal CONT to the subsequent MD 9 as it is.

On the input of a control signal CONT, the MD 9 identifies the appliance specified by the control signal CONT. If the identified result is the MD 9, the MD 9 executes the operation specified by the control signal CONT. If this direction is, for example, a direction for the playback of a disk loaded on the MD 9, the MD 9 gives off a voice signal from a speaker (not shown) mounted in the monitor device 4 by the playback of the disk to deliver the voice signal SA1 to the monitor device 4. Besides, if the direction by a control signal CONT is a direction for recording a voice signal SA2 in a broadcast signal received and decoded by the IRD 2 in the MD 9, the MD 9 records the voice signal SA2 inputted from the IRD 2 via a VCR 6 of VHS type and the monitor device 4. In contrast to this, if the control object of a control signal CONT is not the MD 9, the MD 9 delivers the relevant control signal CONT to the subsequent monitor device 4 as it is. At that time, the monitor device 4 executes the operation specified by the relevant control signal CONT.

(2) Configuration of an IRD

Figure 2:
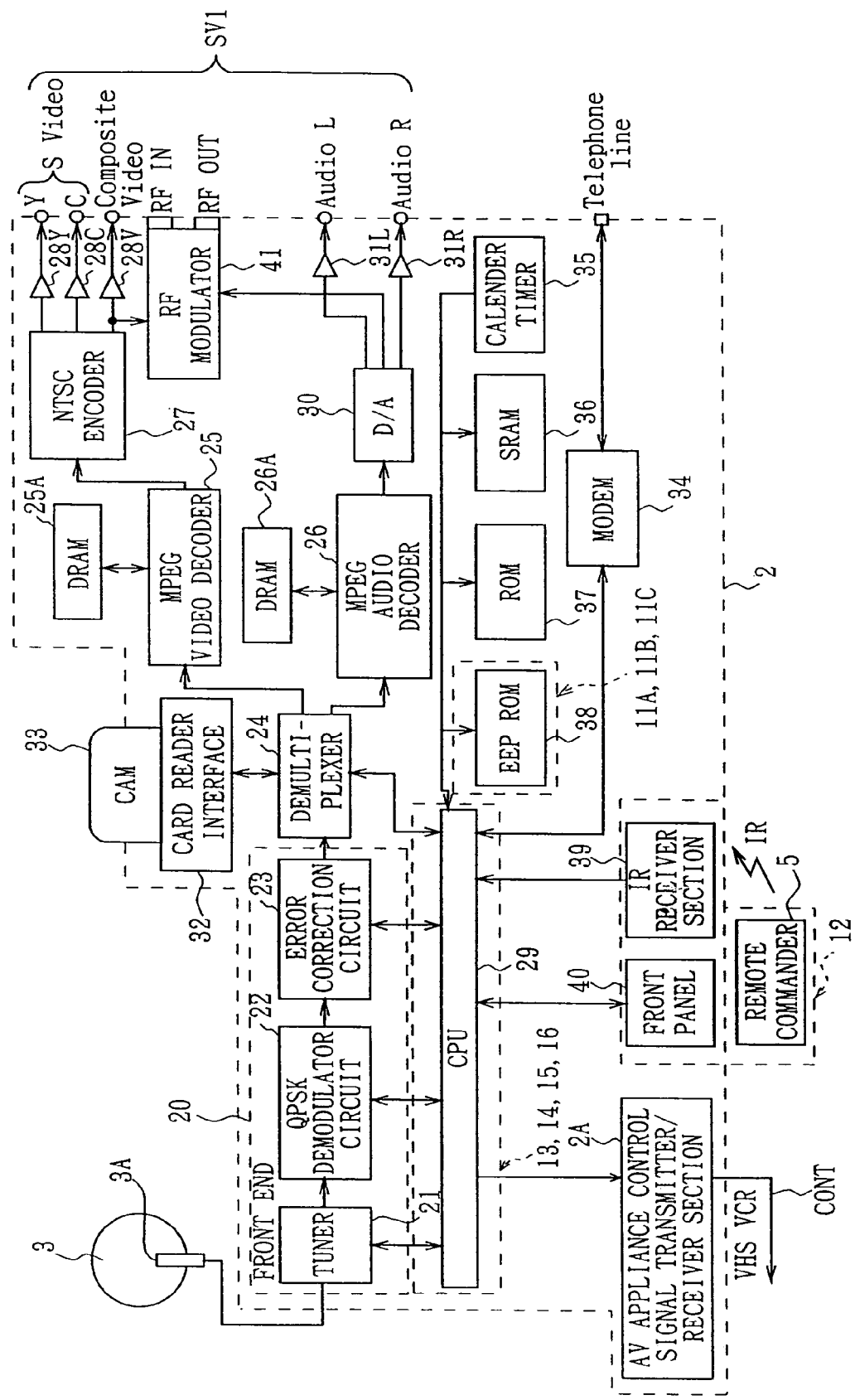
FIG. 2 is a block diagram showing the configuration of an integrated receiver/decoder (IRD) including the keyword creation unit.

In the IRD 2, as shown in FIG. 2, an RF signal outputted from the low noise block downconverter (LNB) 3A of a parabolic antenna 3 is fed to a tuner 21 in the front end 20 and demodulated. An output of the tuner 21 is fed to a QPSK demodulator circuit 22 and QPSK-demodulated. An output of the QPSK demodulator circuit 22 is fed to an error correction circuit 23, whose errors are detected and corrected, and is amended if necessary.

In a conditional access module (CAM) 33 comprising an IC card made of CPU, ROM and RAM, a cipher key is stored together with a decoded program. Since a signal transmitted via a broadcast satellite is enciphered, a key and cipher processing is required for deciphering this cipher. Thus, this key is read out from the CAM 33 via a card reader interface 32 and is fed to a demultiplexer 24. The demultiplexer 24 deciphers an enciphered signal by using this key.

The demultiplexer 24 receives a signal outputted from the error correction circuit 23 of the front end 20, feeds a deciphered video signal to the MPEG video decoder 25 and feeds a deciphered audio signal to the MPEG audio decoder 26.

The MPEG video decoder 25 stores the inputted digital video signal in the DRAM 25A and executes the decode processing of the video signal compressed by the MPEG scheme. The decoded video signal is fed to an NTSC encoder 27 and converted into a brightness signal (Y), chroma signal (C) and composite signal (V) in the NTSC scheme. The brightness signal and chroma signal are outputted as S video signals via buffer amplifiers 28Y and 28C, respectively. Besides, the composite signal is outputted via a buffer amplifier 28V.

The MPEG audio decoder 26 stores an audio digital signal fed from the demultiplexer 24 in a DRAM 26A and executes the decode processing of an audio signal compressed by the MPEG scheme. The decoded audio signal is digital-to-analog converted in a D/A converter 30, the audio signal of the left channel is outputted via a buffer amplifier 31L and the audio signal of the right channel is outputted via a buffer amplifier 31R.

An RF modulator 41 converts the composite signal outputted by the NTSC encoder 27 and the audio signal outputted by the D/A converter 30 into RF signals and outputs them. Besides, this RF modulator 41 allows an RF signal of NTSC scheme inputted from other appliances to pass through the modulator and outputs it to other appliances as it is.

In the case of this embodiment, these video and audio signals are fed to the VCR 6 via an AV line.

The CPU 29 executes various processing in accordance with the program stored in the ROM 37. Besides, the CPU 29 controls an AV appliance control signal transmitter/receiver section 2A, outputs a predetermined control signal to other appliances via a control line and receives a control signal from other appliances.

Directly inputted to this CPU 29 can be a predetermined instruction by manipulating a manipulation button switch in the front panel 40. Besides, on the manipulation of a manipulation key in the remote commander 5, an infrared (IR) signal is outputted by the IR transmitter section of the remote commander 5 and received by an IR receiver section 39, and the received result is fed to the CPU 29. Accordingly, also by the manipulation of the remote commander 5, a predetermined instruction can be inputted to the CPU 29.

Besides, the CPU 29 takes in, for example, the electronic program guide (EPG) information except a video and an audio signal outputted from the demultiplexer 24, makes out EPG data from it and feeds them to an static random access memory (SRAM) 36 and stores them. The EPG information includes information items (such as e.g., channel, time, title and genre of a program and program comment) about the programs of individual channels from the present time to tens of hours later. Since this EPG information item frequently comes by transmission, an up-to-date EPG information item is always retained in the SRAM 36

The CPU 29 can transfer the data stored n the SRAM 36 to an external appliance via a modem 34 and communication means. Meanwhile, as a method for transferring data of the SRAM 36 to an external appliance (floppy disk, card like recording medium, or the like), an output line exclusively for data may be provided in addition to the communication using a modem.

And, in an electrically erasable programmable read only memory (EEPROM) 38, data desired to be retained even after the power off (rewritable data, such as e.g., receiving history for the past 4 weeks of a tuner 21 or data of the data base mentioned later (11A, 11B and 11C)) are stored. Besides, comparing the time information outputted by a calendar timer 35 with the time stamp separated from a received signal and outputted by the demultiplexer 24, the CPU 29 controls the MPEG video decoder 25 or MPEG audio decoder 26 so as capable of conducting a decode processing at a proper timing.

Furthermore, when wanting to generate predetermined on-screen display (OSD) data, the CPU 29 controls the MPEG video decoder 25. Corresponding to this control, the MPEG video decoder 25 creates and writes predetermined OSD data into a DRAM 25A and further reads out and outputs them. Thereby, predetermined characters, pictures and such others can be outputted and displayed in the monitor device 4.

Here, when the manipulation key for program guide is selected in the remote commander 5 or the front panel 40, the CPU 29 controls the MPEG video decoder 25 to display a broadcast program selection screen in the monitor device 4. By moving the cursor to the position of a desired program on this screen and clicking the remote commander 5, a user can select and specify the desired program. At this time, with that program genre corresponding to the liking of a user taken as a keyword which has been created in advance in a keyword creation function block provided in the IRD 2, the list of programs fit for the relevant user is displayed from numbers of programs.

Figure 3:
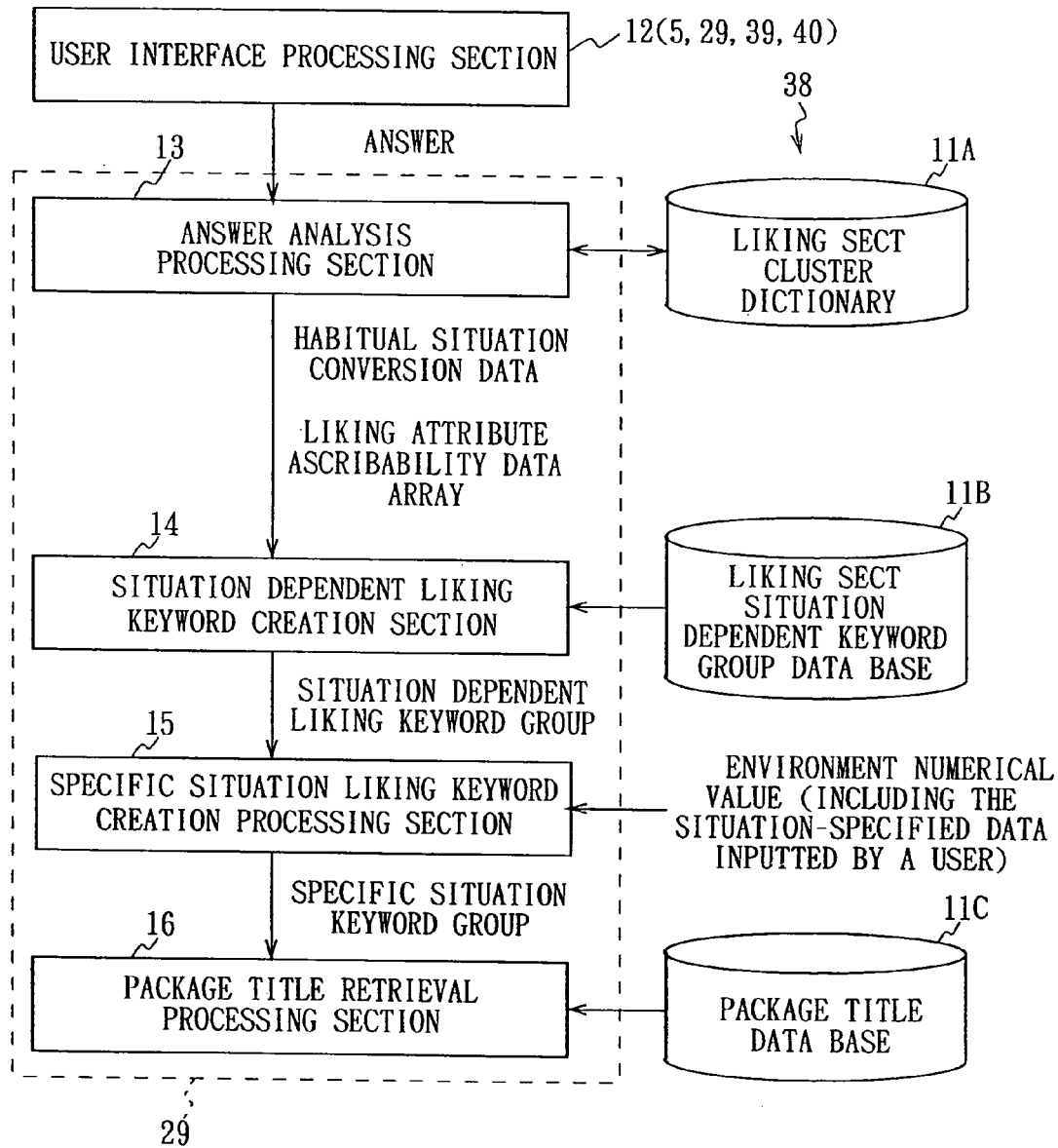
FIG. 3 is a block diagram showing the keyword creation function block of the IRD.

Like this, FIG. 3 shows the creation function block for a keyword employed in the retrieval of the program desired by a user in accordance with the EPG information. That is, in FIG. 3, the user interface processing section 12 corresponds to the remote commander 5, the IR receiver section 39 and the front panel 40 in the IRD 2 (FIG. 2), the answer analysis processing section 13, the situation dependent liking keyword creating section 14, specific situation liking keyword creating section 15 and the package title retrieval processing section 16 correspond to the CPU 29 (FIG. 2) and the liking sect cluster dictionary 11A, the liking-sect-dependent, situation dependent keyword group data base 11B and the package title data base 11C correspond to the EEPROM 38.

(3) Creation of a Keyword by the IRD

FIG. 3 shows the functional block of the portion related to the creation of a keyword in the IRD 2 mentioned above referring to FIG. 2, and the user interface processing section 12 displays an interaction screen for the creation of a keyword on the display screen 4A of the monitor device 4 (FIG. 1) by user's manipulation of the remote commander 5. While specifying the answers for individual question items on this interaction screen by using a cursor, a user inputs a user profile for the creation of a keyword.

These input items first of all include an item for the input of growth stages of a user individual, such as "Advance to a university", "Taking employment", "Wedding", "Bringing up of a child" and "Retirement", in which the relation of a user with his family and society is considered additionally, as the present life stage of the user. In this case, an interaction screen as shown in FIG. 4 is displayed on the display screen 4A of the monitor device 4.

Secondly, the input items include an item for the input of an age/sex. In this case, an interaction screen as shown in FIG. 5 is displayed on the display screen 4A of the monitor 4.

Thirdly, the input items include an item concerning the liking tendency of a user. In this case, an interaction screen for specifying a plurality of liking tendencies as shown in FIG. 6 is displayed on the display screen 4A of the monitor 4.

Fourthly, the input items include an item for the input of a living scene such as "at breakfast", "at lunch", "at supper", "at your ease on a weekday" and "at your ease on a holiday", as living scene/select site environmental phase of a user. In this case, a user inputs his own actual time range (referred to as environmental numerical value/region data) corresponding to each living scene on an interaction screen as shown in FIG. 7 for each day of a week. As a result, data such as "7:00-7:30 of Monday", "7:30-8:00 of Saturday", . . . are obtained, for example, as a living scene for "at breakfast".

In such a manner, when a user's answer is inputted, the user interface processing section 12 delivers the answer to the answer analysis processing section 13. By pairing living scenes inputted by a user with individual time frame identifiers (situation identifiers) represented by the respective different identifiers and day-of-week time range data (region data of environmental numerical values) peculiar to the user corresponding to individual time frame identifiers, obtained on the basis of the answer of a user, for each living scene, the answer analysis processing section 13 obtains the habitual situation conversion data of the user.

FIGS. 8A and 8B show examples of these habitual situation conversion data. That is, FIG. 8A comprises a data array with days of a week and time made into correspondence to the time frame identifier (situation identifier) representing "at breakfast". In this case, since the breakfast is taken in the same time range for a Monday to Friday, these data are represented by a product of data representing the range of days of a week (Monday-Friday) and data representing the range of time (7:00-7:30) and further for Saturday where a breakfast is taken at a different time from that of these weekdays, they are represented by a product of data representing the range of the relevant day of a week (Saturday) and data representing the range of time (7:30-8:00). By a sum of individual data represented by such products of day-of-week range data and time range data, day-of-week/time range data (region data of environmental numerical values) are obtained and habitual situation conversion data are obtained by a combination of these day-of-week/time range data and time frame identifiers (situation identifiers).

Besides, FIG. 8B shows habitual situation conversion data comprising a combination of the time frame identifier (situation identifier) representing "at your ease on a holiday" and day-of-week/time/range data and expresses that the living scene identifier of "at ease on a holiday" corresponds to the time range of 8:00-11:30 both for Saturday and for Sunday. In such a manner, a time frame identifier as the situation identifier established in conformity to the characteristics of a user is the name or number for distinguishing a typical living scene affecting the selection of a program, affects the selection of a program independently of the liking tendency of a user and forms a factor to be selected in accordance with the relevant moments and cases. Incidentally, in addition to a time frame identifier, the situation identifiers include, for example, a partner situation identifier established in accordance with partners common in situation to the relevant user and the common partners of situation include friends, lovers or the like. This partner situation identifier is employed in a keyword creation for the selection of a music program and music software.

Thus, habitual situation conversion data representing the custom of a user, evaluated by a combination of time frame identifiers and region data of environmental numerical values are stored once in the EEPROM 38 (FIG. 2).

Besides, the answer analysis processing section 13 evaluates a liking attribute ascribability data array as data representing the liking tendency of a user that changes depends on time and situation. In this case, an item on liking tendency inputted by a user to the user interface processing section 12 is employed. This item is one inputted from the interaction screen mentioned above in relation with FIG. 6. By answers to this, a plurality of liking attributes such as "knowledge directionality", "activeness directionality", "amusement directionality" and "relaxation directionality" influential on the selection of a program are obtained as the sense of attitude value of a user for TV viewing. Incidentally, at the time of keyword creation for the selection of a music, items for obtaining directional tendency such as "specific genre directioned", "piece notion directioned", "wide sound range directioned" and "trend directioned" are given as questions to a user.

Thus, first based on the answers of a user concerning the liking tendency inputted to the user interface processing section 12, the answer analysis processing section 13 evaluates the liking attributes of the user. That is, the answer analysis processing section 13 establishes the respective directionalities concerning liking attributes such as "knowledge directionality", "activeness directionality", "amusement directionality" and "relaxation directionality", obtained by the answers of a user, as values indicating individual directionalities on the attribute classification axes. Thereby, on the liking attribute classification space formed by individual liking attribute classification axes, the coordinates determined by individual directionalities serve as liking attribute vectors of a user and one point on the liking space determined by this attribute vector becomes the liking attribute point indicating the liking tendency of this user.

Figure 9:
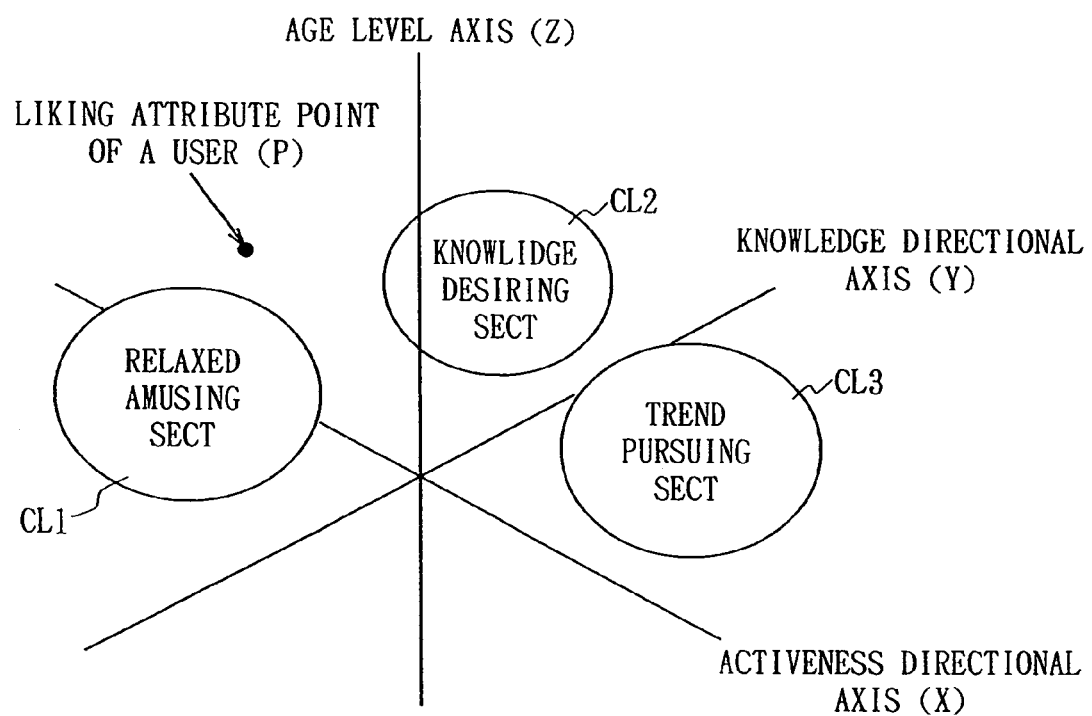
FIG. 9 is a schematic diagram showing a simplified example of liking attribute space.

Incidentally, FIG. 9 shows one example of liking attribute classification space formed by three attribute classification axes, age level axis (Z-axis), activeness direction axis (X-axis) and knowledge direction axis (Y-axis), while the liking attribute point P is evaluated from the age, activeness directionality and knowledge directionality obtained from the input of the user.

Here, when a plurality of liking attribute points are plotted in one liking attribute classification space with many users taken as the population, there are cases where crowded collections (hereinafter, referred to as clusters) appear at several sites. The respective clusters correspond to collections of users having a similar liking attribute and a finite number of clusters are present in the liking attribute classification space which are not always exclusive. The examples of clusters include the knowledge attitude cluster CL1 corresponding to a relaxed amusing sect, the knowledge attitude cluster CL2 corresponding to a knowledge desiring sect and the knowledge attribute cluster CL3 corresponding to a trend pursuing sect as knowledge attitude clusters determined by the knowledge direction axis, the activeness direction axis and the age level axis shown in FIG. 9.

Besides, there is also a case where clusters are formed in the projection subspace using a part of the liking attribute classification axes. In this case, for example, age level clusters are formed in the projection space using the age level axis.

Incidentally, in the liking attribute classification space for the selection of a music, clusters corresponding to a mood fascinating sect, a scream diverging sect and so on are formed.

The name or number employed for distinguishing these clusters are referred to as a cluster identifier and the center of each cluster is referred to as a cluster representative point. Here, the liking attribute point P corresponding to one user does not generally coincide with the representative point of a cluster. Besides, one user is considered to have the liking attribute of the adjacent clusters to some extent. Thus, the degrees of the liking attribute of one user to be ascribed to the respective adjacent clusters are expressed in a numerical array and this numerical array is defined as a liking attribute ascribability data array of the user.

Here, when data on the liking attribute point P of a user is settled, the degrees of ascribability to individual clusters are determined from the liking attribute point P and representative points, stretches and shapes of clusters. Among these, cluster representative points and stretches of clusters are not dependent on the liking attribute point P of the user at all and peculiar to the respective clusters. Thus, from a cluster representative point and a stretch aspect for each cluster, the method for calculating the ascribability (liking attribute ascribability) to the respective clusters can be determined in advance.

The method for calculating the ascribability (liking attribute ascribability) to a cluster will be described below. To evaluate the ascribability (liking attribute ascribability) to a certain cluster when the liking attribute point P of one user is settled, first, the error vector between the liking attribute point P and the cluster representative point is evaluated. Next, using a function that monotonously decreases with larger error vector (i.e., function depending on the stretch of a cluster), its value is calculated.

If the stretch aspect of the function employed for evaluating this liking attribute ascribability is independent of individual liking attribute classification axis direction and isotropic, the inverse of 1.0 plus the square of the length (representing the distance of a stretch) of an error vector normalized by a standard deviation of a stretch (stretch deviation) or the like is set to a liking attribute ascribability. In this case, a city block distance, maximum absolute value component or Euclid distance may be employed as the length of an error vector.

Alternatively, if the stretch of a cluster differs with individual liking attribute classification axes, the inverse of about 1.0 plus the square of a norm having an (rectangular parallelopiped) axis-dependent weight with the inverse of a standard deviation for each liking attribute classification axis taken as the weight coefficient for the relevant axis (i.e. when the cluster regarded as a rectangular parallelepiped) is set to the liking attribute ascribability in place of the above-mentioned isotropic distance.

Alternatively, if a cluster stretches in a direction slant to liking attribute classification axes, the quotient of a definite number by another definite number plus the ellipsoid norm (i.e. when the cluster regarded as an ellipsoid) of quadratic form using the coefficients evaluated from covariance coefficients or the like is set to the liking attribute ascribability.

Incidentally, when the stretch of a cluster is complicated and a general function is necessary, a function wherein the convex polyhedron norm using the maximum of finite number of linear expressions is utilized in place of the above-mentioned city block distance, a function using a neuro or lookup table or the like can be employed.

Various functions set as an ascribability calculation method in this manner are previously stored in a cluster dictionary 11A (FIG. 3), data specified for this ascribability calculation method are the respective functions used for individual clusters in calculating the ascribability of clusters and data for specifying what parameters to execute these functions with, which are combinations of calculation function identifiers expressed in function pointer and calculation parameters such as cluster representative points and cluster stretch degree. The calculation parameters are expressed in a data array, pointers to data structures or the like.

When the liking attribute point P of a user is settled by the analysis of user's answers in the answer analysis processing section 13, calculation of a liking attribute ascribability data array used for the functions and parameters set in such a manner is executed in the answer analysis processing section 13 while referring to the ascribability calculation method specified data corresponding to individual clusters stored in the cluster dictionary 11A.

That is, to calculate a value of ascribability to one cluster, ascribability calculation method specified data for the cluster are fetched from the cluster dictionary 11A, the function specified by the relevant ascribability calculation method specified data is read out with parameters serving as a part of calculation method specified data and liking attribute point data resulting from the answer analysis being employed as augments and is executed. A functional value obtained as an execution result of this function is a cluster ascribability value. A successive substitution of ascribability values, obtained by successively repeating this for all clusters, into array components would provide the liking attribute ascribability data array of the user.

Incidentally, the cluster dictionary 11A is not only provided in the EEPROM 38 (FIG. 2), but can be also read in from a predetermined recording medium or downloaded from the communication line, stored in the EEPROM 38 and used. In this case, the kind and calculation method of clusters become updatable and further a new calculation scheme can be implemented by updating a cluster dictionary together with the registration and addition of a new function program.

Figure 10:
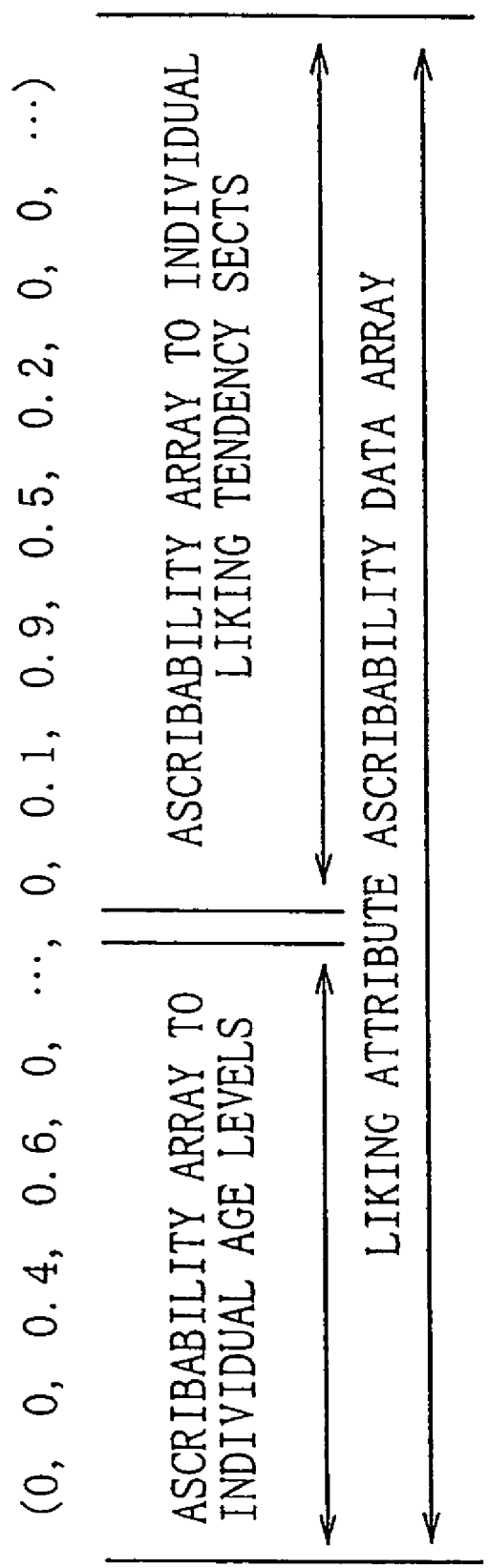
FIG. 10 is a schematic diagram showing an example of liking attribute ascribability data array.

Incidentally, FIG. 10 shows one example of liking attribute ascribability data array, while in an array of ascribability to each age level, individual arrayed numerals represent the ascribability for the respective age levels (e.g., teens, twenties, thirties, . . . ) and individual arrayed numerals in an array of ascribability to each liking sect represent the ascribability for the respective liking sects (e.g., knowledge desiring sect, trend pursuing sect, . . . ). In this case, by limiting individual arrayed numerals to "0" or "1", a numeral signifies a user either perfectly belonging to or completely being independent of each cluster.

In such a manner, when the liking attribute ascribability data array of a user is obtained in the answer analysis processing section 13, the relevant attribute ascribability data array is delivered to the situation dependent liking keyword creation section 14 (FIG. 3) together with the above-mentioned habitual situation conversion data. The situation dependent liking keyword creation section 14 makes the liking attribute cluster corresponding to several highly ascribable members of the liking attribute ascribability data array into the strongly ascribable cluster of the user.

The situation dependent liking keyword creation section 14 fetches the keyword corresponding to the relevant strongly ascribable cluster from the liking-sect-dependent, situation dependent keyword group database 11B. In this liking-sect-dependent, situation dependent keyword group data base 11B, keywords included in liking titles (liking program genres) under various situations, of persons of various tendencies are classified and stored.

That is, generally, typical users ascribed to each liking cluster like titles (program genres) of a definite tendency under a typical situation. Thus, in the liking-sect-dependent, situation dependent keyword group database 11B, a group of keywords frequently appearing in liking titles (program genres) or news items for introduction/summary is prepared previously for each situation classification and for each liking class. Incidentally, at the creation of a keyword in the selection of a TV program, a name of program genre is prepared as a frequent keyword.

To each keyword prepared in the liking-sect-dependent, situation dependent keyword group database 11B, a liking degree is attached.

If at least one liking attribute cluster is specified, this liking-sect-dependent, situation dependent keyword group data base 11B is so arranged that a group of keyword/liking degree pairs divided for each situation classification can be fetched. As an actual construction, a data base, a retrieval server (subroutine, thread and process) and so on are utilized.

Accordingly, depending on a typical situation represented by each situation classification identifier, the situation dependent liking keyword creation section 14 successively fetches the situation liking keyword group of the user corresponding to his strongly ascribable cluster from the liking-sect-dependent, situation dependent keyword group data base 11B. In general, there are a plurality of strongly ascribable clusters, so that a plurality of liking keyword groups are obtained also for a single situation. They are merged (lumped) into a set for each situation. As this way of merge, first, a collection of keywords is obtained by the collection and merge of keyword groups for each cluster. Next, a liking degree paired to each keyword is calculated from the liking degree attached to a cluster keyword and the ascribability to the cluster if the keyword comes from the liking keyword group of a unique cluster. The functional conditions for this calculation is a function having a weak monotonously increasing property for both the original liking degree and ascribability.

For example, there are a method using a product of the liking degree and ascribability, a method using an arithmetic mean, a method using a minimum, etc. Furthermore, a monotonously increasing function by utilizing a lookup table technique may be employed.

Next, on the assumption that the same keyword is included in the liking keyword group for a plurality of clusters, first, the liking degree is evaluated solely for each cluster in accordance with one of the methods mentioned above and their sum or maximum is made into a synthesized liking degree.

In such a manner, by repeating these processing for each situation classification, the liking keyword group (program genre name group) for each situation concerning a specific user is obtained.

The keyword group obtained thus is stored and retained in the EEPROM 38 (FIG. 2). Besides, strongly ascribable cluster data for each user are also stored and retained in the EEPROM 38 and if a liking keyword data base for each liking cluster situation (liking-sect-dependent, situation dependent data base of FIG. 3) is updated, a liking keyword group for each situation for each user can be updated by retrieving the updated data base again and synthesizing it in accordance with the methods mentioned above.

Figures 11, 12:
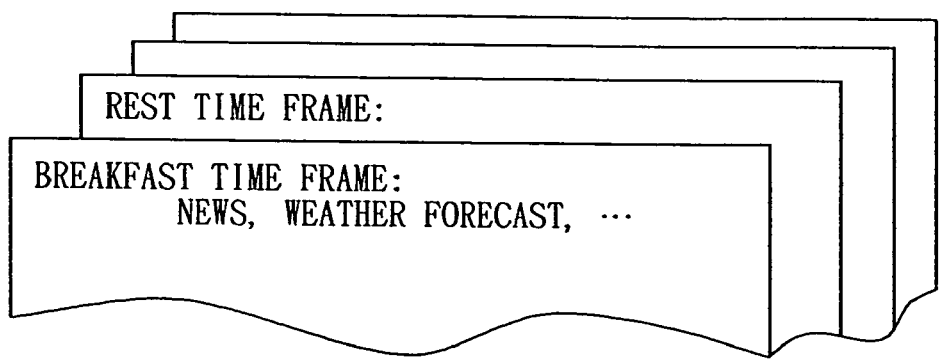
FIG. 11 is a schematic diagram showing an example of situation liking keyword of a user.
FIG. 12 is a schematic diagram showing a specific situation keyword group.

Incidentally, FIG. 11 shows one example of situation dependent liking keywords created in the situation dependent liking keyword creation section 14 and a program genre name group in each situation (at breakfast, at rest, . . . ) is created for each situation.

In such a manner, the situation dependent liking keyword group (FIG. 11) created in the situation dependent liking keyword creation section 14 is delivered to the subsequent specific situation liking keyword creation processing section 15. Here, the specific situation indicates the situation at a specific time point and is typically represented by a situation identifier, but becomes a complex of situations represented by a plurality of situation identifiers according to individual situations. Thus, employed as the representation of specific situations is an array of numerical values, representing the degree of being close to individual typical situations (situation ascribability) represented by situation identifiers. This situation ascribability array will be referred to as situation ascribability data array.

This situation ascribability data array can be automatically created by the relevant system or can be inputted to the system on the spot by a user via input means (user interface processing section 12). For example, the degree of time frame ascribability for discriminating the boundary neighborhood of a time frame on the basis of time is automatically created by the CPU 29 (FIG. 2). In contrast to this, with respect to partner situation or the like on the site, the ascribability to the relevant situation is settled as a result of user's input to specify a situation by using an interaction screen.

On the basis of situation dependent liking keyword groups corresponding to individual typical situations received from the situation dependent liking keyword creation section 14, the specific situation liking keyword creation section 15 evaluates the liking keyword group of a specific user corresponding to a specific situation expressed in a situation ascribability data array through the weighted synthesis using an ascribability. In the weighted synthesis calculation for obtaining the liking degree to be paired to each keyword, a product sum of situation ascribabilities and liking degrees for typical situations can be simply employed. The keyword collection with liking degree obtained thus becomes a specific situation liking keyword group of the specific user. Incidentally, as a technique of weighted synthesis calculation for liking degree, a function that has a monotonuously increasing property concerning all variables may be selected and employed for synthesis.

In such a manner, as shown in FIG. 12, the specific situation keyword group created in the specific situation liking keyword creation processing section 15 is delivered to the subsequent package title retrieval processing section 16 and the corresponding title is retrieved from the package title data base 11C in accordance with the relevant specific situation keyword group. With this embodiment, the EPG data transmitted by a satellite broadcast is stored in the package title data base 11C and the EPG data specified by a program genre created as a specified situation keyword group is retrieved. On the display screen 4A of the monitor device 4, a plurality of characters representing the programs retrieved by these EPG data are displayed and a user can select the relevant program by specifying any of the relevant characters.

Incidentally, the content of the package title data base 11C is updated for each fetch of a new EPG data, thus always retaining up-to-date data.

(4) Operation and Effect of the Embodiment

In the above arrangement, when a user inputs daily items such as user's existing life stage, age/sex, user's liking tendency and user's living scene/selected site environmental phase by means of an interaction screen displayed on the monitor screen, the keyword creation block section (FIG. 3) of the IRD 2 creates habitual situation conversion data related to the habitual situation of the user and liking attribute ascribability data related to the liking attribute of the user and thereby creates a keyword group for retrieval reflecting the liking tendency of the user under a specific situation in a specific field.

Thus, only if, even without a professional knowledge on retrieval such as keywords always updated and up-to-date knowledge on genre classification methods, a user answers a daily simple question on items related to habit and liking once, programs conforming to the situation peculiar to the user and his liking are continuously retrieved from that time.

Besides, only by rewriting the liking-sect-dependent, situation dependent keyword data base stored in memory means such as an EPPROM 38, up-to-date keywords can be treated immediately. Thereby, without learning up-to-date keyword by heart, a user can always cope with the update of keywords.

Thus, according to the above arrangement, the load of a user concerning retrieval can be greatly reduced.

(5) Other Embodiments

Incidentally, in the above embodiment, the case of inputting the life stage, age/sex, liking tendency and living scene as input items of a user has described, but the present invention is not only limited to this case and the input items may be reduced to several of them or other items may be added.

Besides, in the above embodiment, the case where a keyword creation block for information retrieval is provided inside the IRD 2 for receiving a satellite broadcast has described, but the present invention is not only limited to this and a keyword creation unit may be provided separately.

Furthermore, in the above embodiment, the case where the present invention was applied to a device for retrieving a program of digital satellite broadcast has described, but the present invention is not only limited to this and is widely applicable to the keyword creation unit of various information retrieval apparatus such as, e.g., for retrieving a vast amount of information by means of internet and retrieving items of package information in a compact disk or the like.

As mentioned above, according to the present invention, the habitual situation characteristics and the degree of typical liking tendency of a user are calculated on the basis of answers on daily items of the user, typical situation dependent keyword(s) of the user in one or more individual typical situations previously prepared is(are) created in accordance with the degree of typical liking tendency of the user and typical situation dependent keyword(s) is(are) revised in accordance with the habitual situation characteristics of the user, so that keyword(s) according to the actual situation of the user can be created.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. An apparatus for recommending one or more particular content that meet a user's preference, comprising:
   a user interface that enables answers to be inputted to a number of questions provided to a user;
   creating means for creating user preference information which includes habitual situation characteristics of said user and a degree of a typical tendency of said user based on the answers,
   wherein the user preference information is generated based on a group of retrieval keywords such that one or more keywords correspond to one or more attribute clusters,
      wherein the attribute clusters are formed from a plurality of users' answers,
      wherein the users' answers are values on attribute classification axes, indicating individual directionalities, and
      wherein the one more keywords are linked to the attribute clusters;
   a user's preference database for storing said created user preference information;
   a processor adapted to search content that may be of interest to the user as a function of said user's preference database and content guide information; and
   a display processor adapted to generate a display signal representing a list of said searched content.

2. The apparatus according to claim 1, said user interface enables said user to select one or more content from said displayed list viewing.

3. The apparatus according to claim 1, further comprising a decoder for decoding compressed video and audio signals which represents said selected one or more content.

4. The apparatus according to claim 1, further comprising a content guide for receiving content guide information and content guide database for storing received content guide information.

5. The apparatus according to claim 1, further comprising a tuner for receiving a television signal and wherein said user's preference database tuning history data of said tuner.

6. A method for recommending one or more particular content that meet a user's preference, comprising:
   inputting answers to a number of questions provided to a user;
   creating user preference information, which includes habitual situation characteristics of said user and a degree of a typical tendency of said user based on the answers,
   wherein the user preference information is generated based on a group of retrieval keywords such that one or more keywords correspond to one or more attribute clusters,
      wherein the attribute clusters are formed from a plurality of users' answers,
      wherein the users' answers are values on attribute classification axes, indicating individual directionalities, and
      wherein the one more keywords are linked to the attribute clusters;
   storing said created user preference information;
   searching content that may be of interest to the user as a function of said user preference information and content guide information; and
   generating a display signal representing a list of said searched content.

7. The method according to claim 6, further comprising selecting one or more content from said displayed list viewing.

8. The method according to claim 6, further comprising decoding compressed video and audio signals which represents said selected one or more content.

9. The method according to claim 6 further comprising receiving content guide information and content guide database for storing received content guide information.

10. The method according to claim 6, further comprising receiving a television signal and wherein said user's preference database tuning history data of said tuner.

* * * * *